G. H. REYNOLDS.

Assignor of One-half Interest to C. H. DELAMATER & G. H. ROBINSON.

RELIEF APPARATUS FOR AIR COMPRESSORS.

No. 7,333. Reissued Oct. 3, 1876.

Witnesses
John Becker
Fred. Harris

G. H. Reynolds
by his Attorneys
Brown
Allen

UNITED STATES PATENT OFFICE.

GEORGE H. REYNOLDS, OF NEW YORK, N. Y., ASSIGNOR OF ONE-HALF INTEREST TO CORNELIUS H. DELAMATER AND GEORGE H. ROBINSON.

IMPROVEMENT IN RELIEF APPARATUS FOR AIR-COMPRESSORS.

Specification forming part of Letters Patent No. 160,956, dated March 16, 1875; reissue No. 7,333, dated October 3, 1876; application filed September 21, 1876.

*To all whom it may concern:*

Be it known that I, GEORGE H. REYNOLDS, of the city, county, and State of New York, have invented certain new and useful Improvements in Relief Apparatus for Air-Compressors; and I do hereby declare that the following is a full, clear, and exact description of the same, reference being had to the accompanying drawing, which forms part of this specification.

This invention is more particularly, but not exclusively, designed to be applied to air-compressors driven by a steam-engine or other motor, the duty of which is multifarious, or not restricted to that of merely operating the compressor, and when the invention is thus applied it has various functions. Thus it enables the compressor running at a fixed speed, which, when uninterrupted, is over and above that required to keep up the necessary supply of compressed air, to relieve itself from load, and to deliver no more air than required, and to resume its compressing action again, as necessity requires. It also serves to prevent an excess of pressure in the reservoir or receiving-pipes for the compressed air, without blowing off or wasting the latter; likewise, the establishment of any given fixed pressure therein, free from interference by irregularity in the work being done; also, economizes the driving-power by running the compressor *in equilibrio* whenever the operating-power is in excess of what is required to produce the required compression. The invention also serves to detect leakage in the reservoir or pipes which receive or conduct the compressed air to its place or places of use.

To these ends, or certain of them, the invention consists in a relief-valve or apparatus applied to the compressor, and controlled by a valve which is governed by the pressure of the compressed air delivered by the compressor, and is weighted or loaded to the pressure at which it is required to maintain the supply of compressed air.

The invention also consists in a certain combination of said devices, as adapted to a particular connection with the compressor, which application of the invention will serve as well as any other to illustrate its action, and will, accordingly, here be selected to explain the invention.

Figure 2:
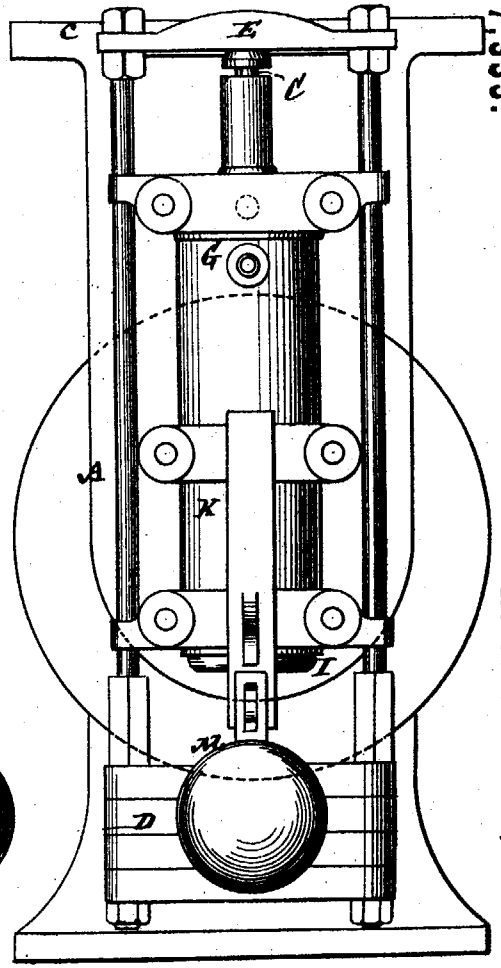
Figure 1:
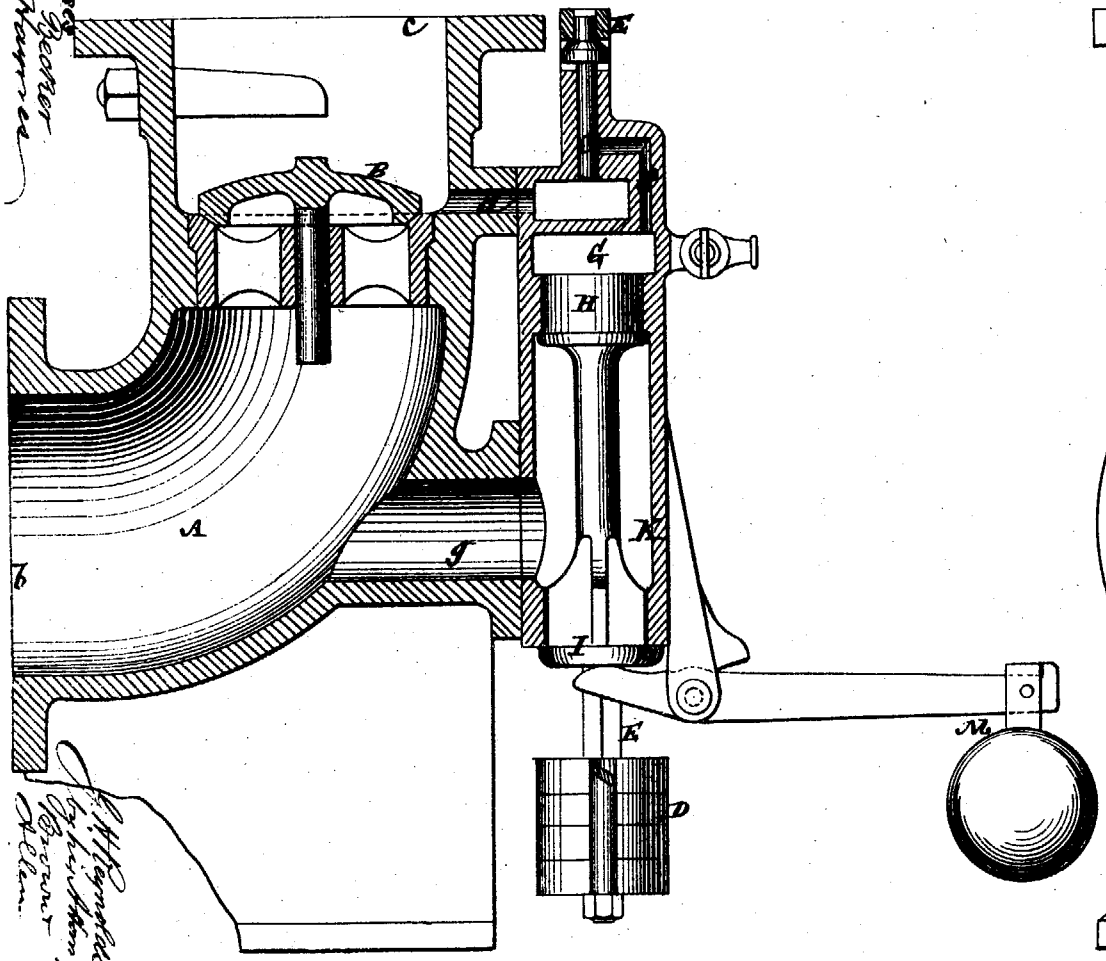

Figure 1 represents a longitudinal sectional elevation of the invention, applied as above described; and Fig. 2 an end elevation thereof.

In the accompanying drawing, A is a pipe or duct, which is connected at its one end *b* with an air-compressor, and at its other end *c* with the reservoir or pipe, which receives the compressed air delivered by the compressor. B is a check or discharge valve of the compressor. (Here shown as arranged in or controlling the duct A, and operating to allow of air being delivered through it by the compressor into the reservoir or receiver.) Thus the duct A communicates with the air which has been delivered by the compressor, and has combined with it a valve, C, for controlling the pressure.

In connection with the duct A, exterior to the valve B, is a duct, *d*, which allows of the compressed air that has been delivered through said valve to act on the one end or under side of the pressure-regulating valve C. This valve, which is here shown as of plug-form, is kept closed or down to the pressure required in the reservoir or receiver either by a spring or weight—as, for instance, by a series of weights D, connected with said valve by a yoke, E. This valve C, when raised by any excess of pressure on the under side of it, does not waste or blow off the surplus compressed air to the atmosphere, but simply conducts it, by a passage, *f*, to a cylinder or chamber, G, containing a piston, H, which has connected with it a relief-valve, I, at the lower end of a valve-box, K. This valve opens to the atmosphere when the piston H is moved downward or inward by the compressed air entering the cylinder G by the passage *f*, as hereinbefore described. The valve-box K is in free communication between the piston H and valve I by a passage, *g*, with the duct A below or on the compressor side of the check-valve B, and the valve I is balanced by the piston H as regards pressure in the valve-box K. The valve I is lifted or closed to the atmosphere by a spring or weight, M, when there is no surplus pressure acting on the piston H to depress it, the weight M being regulated to resist a given pressure.

The operation of the invention, when the parts are arranged as described, is as follows: Supposing the engine or motor, which may be kept regularly going at any fixed or given speed, to have actuated the compressor till the requisite pressure has been obtained in the compressed-air reservoir or receiving-pipes, then no action of the valves C and I takes place, and draft upon said reservoir or pipes is compensated for by a continued supply of air from the compressor through its check or discharge valve B; but there can no excess of pressure accumulate in the reservoir, inasmuch as any tendency to excess of pressure therein, whether produced by diminished demand for the compressed air, or by the working capacity of the compressor being greater than is needed if kept continuously working, will cause the valve C, which it is desirable should be very sensitive, to rise and open the passage *f*. This allows a portion of the delivered compressed air, having an excessive pressure, to act upon the piston H, and open the relief-valve I to the atmosphere, and to establish free communication between the compressor and the external atmosphere, thus causing the compressor to work *in equilibrio* till draft on the compressed-air reservoir or receiving-pipes diminishes the pressure of the previously-delivered compressed air therein below the limit of the loaded controlling-valve C.

When the pressure, however, has been thus reduced, the valves C and I close again, and the compressor, working no longer *in equilibrio*, delivers more compressed air through its discharge or check valve B to make up the deficiency. In this operation of the parts the relief-valve I remains positively closed until the controlling-valve C is opened, and then opens or operates promptly.

Thus a uniform pressure may be kept up in the reservoir without wasting or blowing off compressed air, and the compressor may be kept continually running at a fixed speed, regardless of the irregularity of the draft or drain on the compressed air delivered by the compressor, and when the latter is not compressing air it simply runs *in equilibrio*, and, beyond what is necessary to overcome friction, takes little or no power to work it, no air being then compressed by it. The compressor, accordingly, when running at a fixed speed, is enabled to relieve itself from load and deliver no more air than required, and to renew its duty when a further supply of compressed air is necessary. These advantages are not due to any mere arrangement of parts, as here shown, including the various ducts and valves, nor yet to any special construction of the relief apparatus, but to a combination with the compressor of one or more relief-valves operating, when open, to allow of the compressor running *in equilibrio*, and which are controlled by a valve that is governed by the pressure of the compressed air delivered by the compressor.

In addition to the foregoing description of the general action of the invention, it may be observed that the invention also acts as a leakage-detector, inasmuch as, when the compressor is under regular or constant action by the motor, it is only necessary to close all regular draft from the compressed-air reservoir or receiving-pipe, and then to observe the number of strokes made by the motor or by the compressor, with the valves C and I open or closed. Thus, if the leakage is fifty per cent., then the valves C and I will open during half the strokes of the motor and compressor in a given time, whereas, if there be no leakage at all, said valves should remain open all the time after the pressure limited by the valve C had been reached, provided, of course, that during such test no draft for working purposes is made upon the compressed air in the reservoir or receiving-pipes.

I claim—

1. The combination of a relief-valve, operating to establish communication between the compressor and the external atmosphere, and a supplementary valve governed by the pressure of the air delivered by the compressor, and controlling the action of the relief-valve, substantially as specified.

2. The combination, with a duct, A, in communication with the compressed-air reservoir or receiving-pipes, of a check-valve, B, through which the air is discharged by the compressor, a relief-valve, I, opening communication between the compressor and the external atmosphere, and the controlling-valve C operated by the pressure of the air on the delivery side of the check-valve, and governing the action of the relief-valve, essentially as and for the purpose or purposes specified.

GEO. H. REYNOLDS.

Witnesses:
FRED. HAYNES,
EDWARD B. SPERRY.